United States Patent [19]

Weule et al.

[11] Patent Number: 4,877,325
[45] Date of Patent: Oct. 31, 1989

[54] MACHINE COMPONENT ACCURACY MEASURING SYSTEM

[75] Inventors: Hartmut Weule, Karlsruhe; Bernhard Reichling, Rülzheim, both of Fed. Rep. of Germany

[73] Assignee: Polytec Gesellschaft für Analysen, Mess-& Regel- Technik mbH & Co., Waldbronn, Fed. Rep. of Germany

[21] Appl. No.: 33,074

[22] Filed: Mar. 31, 1987

[30] Foreign Application Priority Data

Apr. 4, 1986 [DE] Fed. Rep. of Germany ....... 3611209

[51] Int. Cl.⁴ .............................................. G01B 11/00
[52] U.S. Cl. ..................................... 356/373; 356/375
[58] Field of Search ................ 356/373, 375, 358, 363, 356/152; 250/561

[56] References Cited

U.S. PATENT DOCUMENTS 4,714,339 12/1987 Lau et al. ............................ 356/358

FOREIGN PATENT DOCUMENTS 2847718 5/1979 Fed. Rep. of Germany .
3241510 10/1984 Fed. Rep. of Germany .
3408437 9/1985 Fed. Rep. of Germany .

OTHER PUBLICATIONS

"Fertigungstechnik", (Manufacturing Technology) 1979, vol. 101, No. 46 of Aug. 1979, pp. 27-33, article by Pfeifer and Weck, Anwendung der Laser Messtechnik zur Beurteilung von Werkzeugmaschinen, (Application of Laser Measuring Technology to Judge Machine Tools).

Primary Examiner—F. L. Evans
Attorney, Agent, or Firm—Frishauf, Holtz, Goodman & Woodward

[57] ABSTRACT

The apparatus uses a laser, the beam of which crosses the working space of the machine element. A photo detector that is sensitive to the position of the laser beam is located in a measuring head connected to the machine element and is connected with a computer for signal processing. The photo detector is preceded by a beam splitter for the laser beam, which deflects the split portion of the beam and sends it to a second photo detector sensitive to the position of the laser beam, which is also connected to the computer.

22 Claims, 9 Drawing Sheets

MACHINE COMPONENT ACCURACY MEASURING SYSTEM

Reference to related publications:

German patent Disclosure Document
DE-OS 28 17 718, Krieg
German patent Disclosure Document
DE-OS 32 41 510, Pryor
German patent Disclosure Document
DE-OS 34 08 437, Thiemann et al Publication "Fertigungstechnik" ("Manufacturing Technology"), 1979, Vol. 101, No. 46, of August 1979, pp. 27–33, article by Pfeifer and Weck, "Anwendung der Laser-Messtechnik zur Beurteilung von Werkzeugmaschinen" ("Application of Laser Measuring Technology to Judge Machine Tools")-and extensive references cited on page 33 thereof, particularly articles in the Hewlett & Packard Journal and Hewlett & Packard Publication.

The present invention relates to apparatus to measure the accuracy of a movement or a position reached after a movement of a machine component, for example a movable machining head, by utilizing laser beam technology.

Background. It has previously been proposed to determine the accuracy of positioning the machine component with a laser, emitting a beam within a working space of a machine component. The machine component, for example a machining head or the like, has a measuring head coupled thereto which includes a photo detector which is characterized by providing output signals representative of the position of the laser beam on the photo detector. These signals can then be applied, for example after amplification, to a computer for further signal processing. Computers of this type are well known, see for example the reference publications.

The machine component which is to be analyzed for position or movement may for example be a machine element forming part of a robot; and, especially, the tip of a machine tool which may be carried or operated by the robot. The invention will be described with respect to such a machine tool tip—by way of representative example—without, however, limiting the invention to this particular element; the invention may be used with all types of machine components of any construction, whether having a tool tip or not.

Industrial robots, that is, equipment that is freely programmable as needed for manipulation, machining and manufacturing purposes, are used to an ever-increasing extent an automated manufacturing plants and for performing work that is harmful to health. Ever-increasing accuracy is demanded in the work done by the robots, both in terms of the positions to be approached by the machine tool tip or gripper and in terms of the accuracy of the path of motion of the machine tool tip or gripper.

Important factors influencing these aspects are the particular working radius of the robot arm carrying the tool tip or gripper as a function of its own weight and of the weight of the workpiece being moved, and the associated flexing of the robot arm, as well as the mutual play among the robot elements movably connected to one another. Because of these factors, the desired paths cannot be adhered to and the desired positions cannot be attained exactly, no matter how accurate the programming.

Accordingly, under the specific working conditions taken into consideration, the procedure used partly involves moving the tool tip to the desired positions or having it trace the desired path point by point; the values obtained in this process from incremental transducers are supplied to a computer. This procedure is very complicated and time-consuming, so that it is a major factor each time the robot is readjusted for a new task. Also, it is difficult, if not impossible, to take into consideration factors resulting from the forces of acceleration in the course of relatively rapid movements of the robot.

There is accordingly a strong interest in measuring the movement and positional accuracy of the apparatus as accurately as possible for the working space of the tool tip of the robot, so that its suitability for particular tasks can be determined definitively.

One attempt that has therefore been made, among others, is to provide different movement paths, with the aid of a cable spanning a room, so that these paths can be tracked by a rotationally symmetrical measuring loop through which the cable was guided and which is attached to the tool tip, and to draw conclusions as to path deviations from the change in spacing between the cable and the loop. This proved to be adequately accurate; individualization of the measurement, however, proved to be attainable only with difficulty, and realization of numerous random reference lines was difficult.

In order to address these problems, an apparatus of the above type has already been attempted in which random reference lines can be produced very quickly and accurately. Also, the beam impingement position sensitive photo detector, which when impinged upon by a beam of light, as is well known emits two electrical signals dependent on the position of the spot of light provides high measurement accuracy. It remains a disadvantage, however, that the known beam impingement position sensitive photo detectors have a relatively small measurement range. Also, with this apparatus only deviations in the plane of the two coordinates disposed at right angles to the laser beam can be detected, so that no information can be gained as to the orientation or tilting of the tool tip. Moreover, a measured value in a coordinate direction parallel to the laser beam cannot be detected.

The Invention. It is therefore the object of the invention to improve an apparatus of the above type so that the orientation of the machine element, e.g., machine tool tip, can be detected. A further object of the invention is to enable enlargement of the measuring range, and finally, the apparatus should be expanded to provide an opportunity to pick up measured values produced in the direction of the laser beam as well.

Briefly, the first photo detector in the measuring head is preceded at a first distance by a beam splitter for splitting the laser beam and deflecting the split portion of the beam in a direction deviating from that of the laser beam, and a second beam impingement position sensitive photo detector is located after the beam splitter in the measuring head in the path of the deflected portion of the beam, at a second distance different from said first distance; and the position-dependent signals of the second photo detector can be supplied, optionally after amplification, to the computer for further signal processing.

Suitably the laser beam is split in half, with one half continuing in the same course and the other half being deflected. This makes it possible to detect rotation of the tool tip (or machine element) about the two coordinate axes located at right angles to the direction of the laser beam and to deliver values accordingly to the computer, so that changes in the positioning of the tool tip can also be detected during movement along the path defined by the laser beam.

It is advantageous that the beam splitter in the measuring head is preceded, optionally via an interference filter, by an optical system for varying the measuring range of the photo detectors, and that the optical system may be made interchangeable. This affords the possibility, not existing previously, in particular of enlarging the measuring range despite the limitation in terms of the plane area of the position sensitive photo detectors, and because of the optical system, beam deflections resulting from changes in orientation of the tool tip and lending the impression of a deviation, from the path, that does not in fact exist can be corrected in the computer, because such deviations are ascertained by the second photo detector from the orientation and are known in terms of their magnitude and direction.

In another feature of the invention, the beam splitter and optionally the optical system may be preceded in the measuring head by a second beam splitter for splitting the laser beam and deflecting the split portion of the beam into a direction deviating from that of the laser beam; the second beam splitter in the measuring head may be followed by an optical element for parallel reflection of the split portion of the beam; and the laser may have a reception and signal unit for the split and parallel-reflected portion of the beam, for computer-aided interferometric determination of the spacing between the laser and measuring head or machine element. It has proved to be suitable for more than 50% and preferably approximately 95% of the laser beam to be deflected by the second beam splitter onto the optical element, which may for example be a triple mirror.

With these provisions and arrangements it is now possible, with the aid of the interferometric length or spacing measurement that is known per se, also to detect the measured values marking the course of the tool tip along the laser beam and to associate them respectively with the aforementioned measured values.

Finally, a system emitting at least a second laser beam parallel to the first may be used, and a further photo detector, connected to the computer, for the second laser beam may be located next to at least one of the first two photo detectors. As an alternative to this, however, it may also be suitable for a system emitting at least a second laser beam parallel to the first to be used, for the laser beams to be amplitude modulated, and for at least one of the photo detectors to be switchable in its modulation frequency to different inputs of the computer.

With the provisions according to one of these alternatives, it is also possible to detect rotations of the tool tip about the coordinate axis parallel to the laser beam, by suitable computer processing of the resultant shifting, at the photo detector or detectors, of the light spots generated by the laser beams relative to the signals caused thereby.

The overall result attained by the provisions according to the invention is an apparatus of the above type in which the accuracy of movement and positioning of the tool tip of an industrial robot or machine element can be ascertained quickly, very accurately, and completely with respect to all degrees of freedom and in the course of automated movements along the laser beam for different loads; furthermore, the number of paths required for detecting the space swept by the tool tip can be established by suitable change of orientation of the laser beam, without difficulty and without expending a great deal of time.

Further features and details of the invention will become apparent from the ensuing description of an exemplary embodiment, taken in conjunction with the drawings.

DRAWINGS:

FIG. 4b is a diagram of another embodiment.

Figure 1:
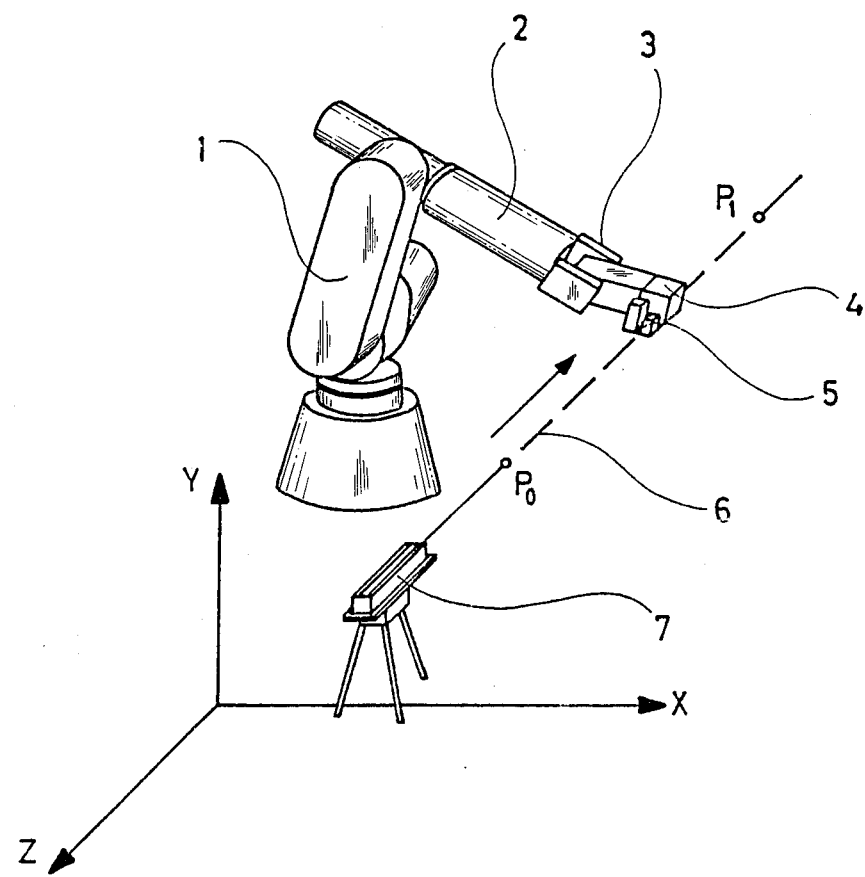
FIG. 1 is a simplified illustration of the structure of the apparatus according to the invention.

Detailed Description: FIG. 1 shows an industrial robot 1, which is program-controlled with the aid of a computer, having a movable robot arm 2 and a tool tip 3 supported at the end of this arm and taking the form of a gripper bearing a measuring head 4. With its light entry opening 5, the measuring head 4 is aligned with respect to a rectilinear path 6, which formed by the beam of a helium-neon laser 7, and extends parallel to the Z axis of the cartesian coordinate system shown, which also includes the axes X and Y.

Figure 2:
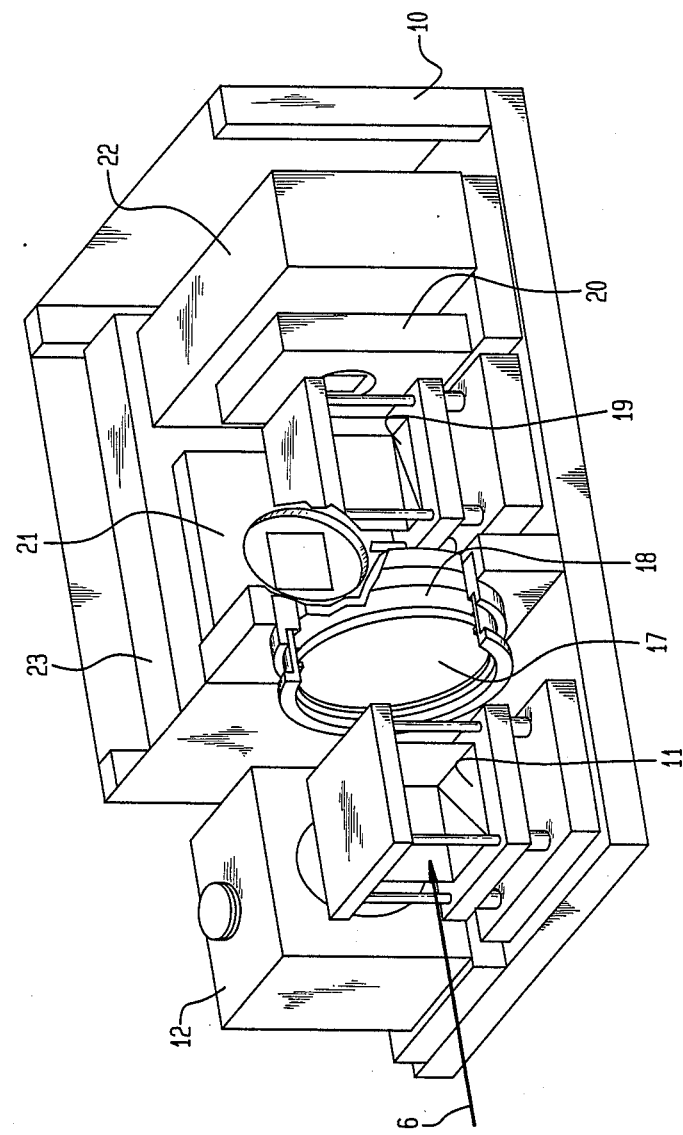
FIG. 2 is a perspective view of a measuring head, partly open and cut away.
Figure 3:
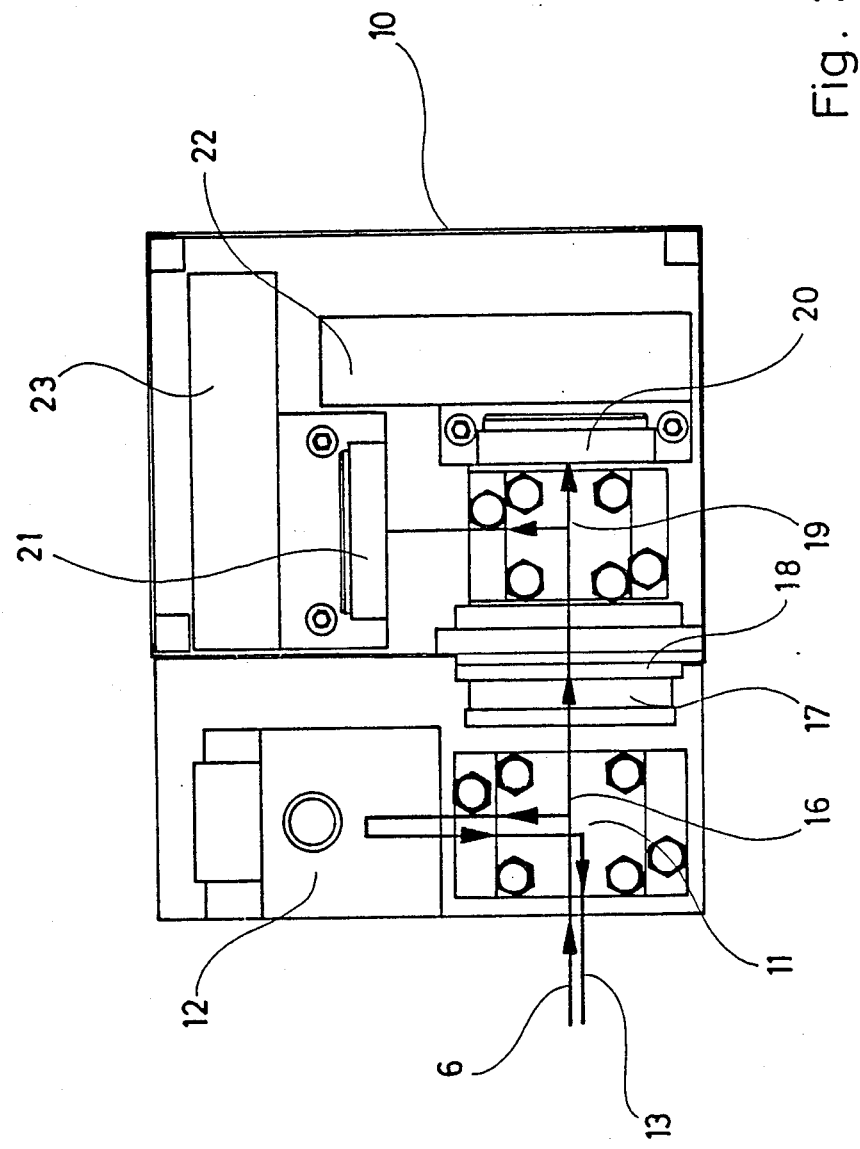
FIG. 3 is a plan view on the measuring head of FIG. 2 showing the beam path.
Figure 4:
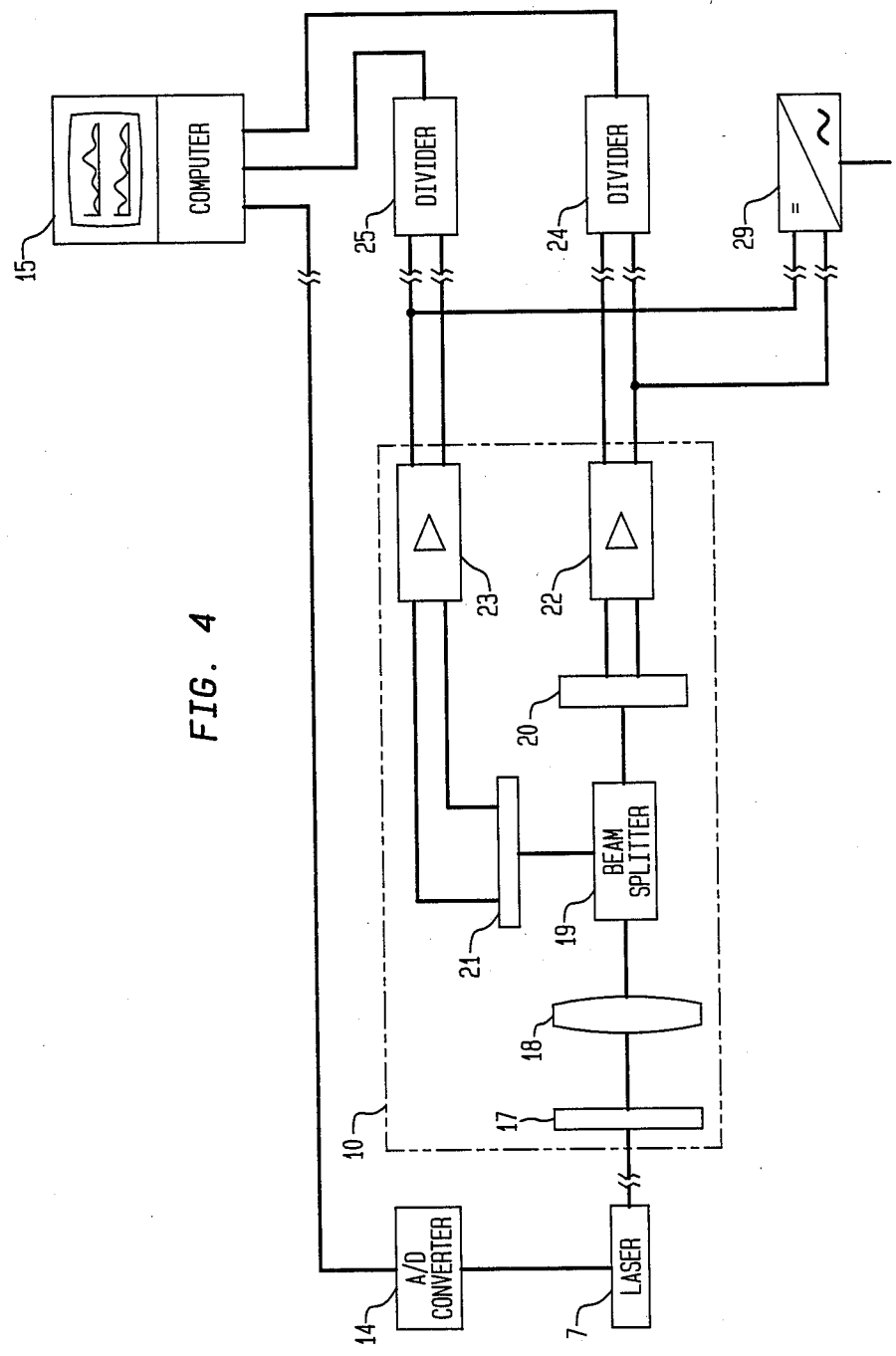
FIG. 4 is a basic circuit diagram for the apparatus.

By suitable programming of the robot 1, the measuring head 4 with its light entry opening 5 is guided between the terminal points $P_0$ and $P_1$ along the path 6, and in a manner associated with the values in the Z direction, deviations of movement of the measuring head 4 from the path 6 in the direction of the coordinates X and Y as well as deviations in terms of orientation with respect to these axes are detected and supplied in the form of electrical signals to a computer for signal processing. To this end, the structure of the essential portion of the measuring head 4 shown in further detail in FIGS. 2 and 3 is provided. The measuring head has a housing 10, in which the laser beam 6 enters from the left as seen in the drawings, and is then split by a beam splitter 11 approximately in such a manner that only about 5% of the light continues its course in a straight line, while 95% of the beam is deflected at right angles and projected onto a triple mirror 12 (FIG. 3), from whence it is reflected in parallel-shifted form and takes the course 13 back to the laser 7, where it is picked up for interferometric detection of the position of the measuring head 4 in the Z direction by a reception and signal unit, which is not shown in the drawing because it is known. This reception and signal unit, as FIG. 4 shows, supplies its signals to an adapter 14, from which, after conversion into a suitable data format, they are sent to a computer 15 for signal processing. The beam portion 16 continuing in a straight line from the beam splitter 11 passes through an interference filter 17 and an interchangeable optical system 18 for enlargement of the measuring range in the X and Y direction, and after that meets a further beam splitter 19. This beam splitter admits half the beam of light in a straight line so that it meets a beam impingement position sensitive photo detector 20, while the other half of the beam of light is deflected at a right angle and meets a beam impingement position sensitive photo detector 21. Beam impingment position sensitive photo detector 21 being positioned at a distance from said beam splitter 19 different from the distance between said beam splitter and said beam impingement position sensitive photo detector 20, one of said distances preferably may in this case be the focal distance of said optical system 18. As particularly shown in FIG. 4, an amplifier 22 is associated with the outputs of the detector 20 and an amplifier 23 is associated with the outputs of the detector 21, and adjoining the amplifiers are dividers 24 and 25 for the signals, which dividers are then in turn connected with the computer 15.

Figure 5:
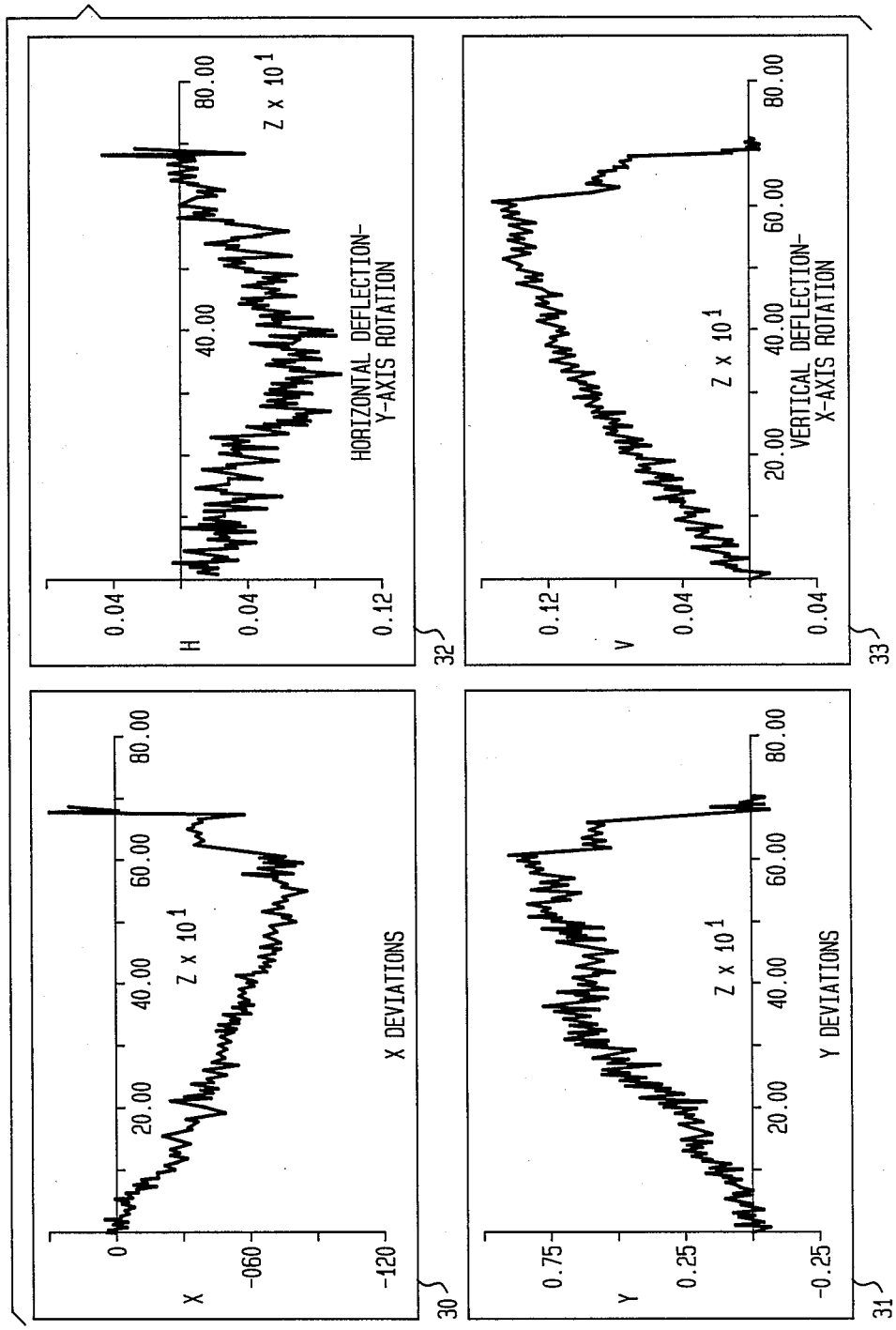
FIG. 5 shows some typical resultant measured value courses.

FIG. 5 shows some typical curves of the deviations of the measuring head 4 from the path 6 in its continuous movement from $P_0$ to $P_1$, in which, in each case plotted over Z, diagram 30 shows the deviation in the X direction picked up at the detector 20, diagram 31 shows the deviation in the Y direction picked up at the detector 20, diagram 32 shows the horizontal deviation picked up at the detector 21, that is, the rotation of the measuring head 4 about the Y axis, and diagram 33 shows the vertical deviation at the detector 21, that is, the rotation of the measuring head about the X axis. The nonuniformity of the courses of the measured values illustrate the discontinuous overcoming of movement resistances resulting from friction of the movable parts of the robot.

Figure 6:
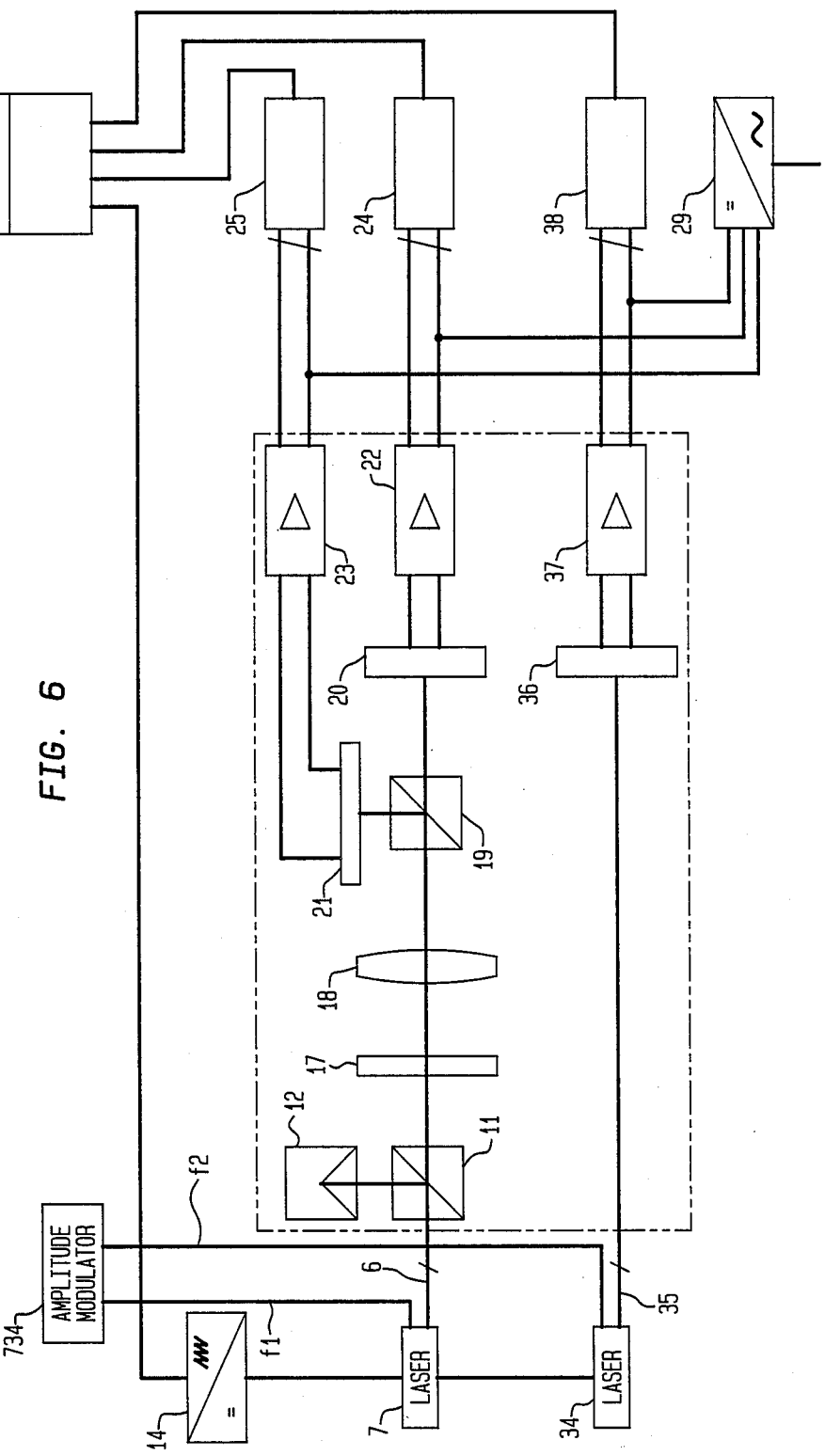
FIG. 6 is a fundamental illustration of a modified wiring diagram in a drawing analogous to FIG. 4.
Figure 6A:
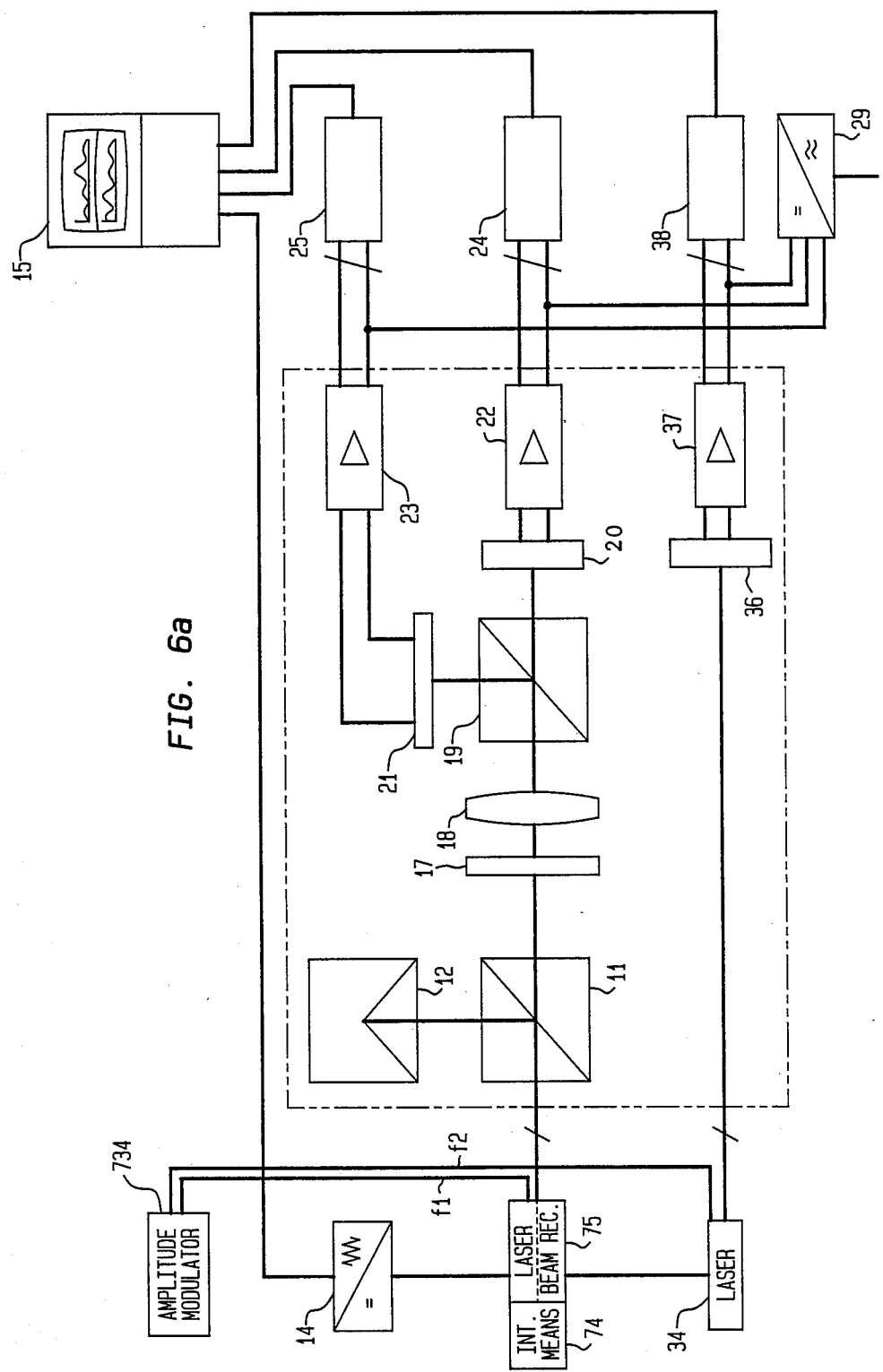
FIG. 6a is a more detailed view thereof.

If, in addition to the deviations shown in FIG. 5, a rotation of the measuring head 4 about the Z axis, that is, about the axis represented by the laser beam 6, is to be detected, this is easily done in the manner explained in FIG. 6. The elements in FIGS. 6 that have already been described in conjunction with FIG. 4 are identified with the same reference numerals and need no further description here. In FIG. 6, from a laser 34, a further beam of light 35, parallel to the beam 6, is emitted and directly strikes a photo detector 36, which is located beside the photo detector 20 and is connected to the computer 15 in a comparable manner via an amplifier 37 and a divider 38. The mutual shifting of the spots of light generated on the photo detectors 20 or 36 by the laser beams 6 or 35, with suitable processing by the computer 15, provides information as to the displacement of the measuring head or tool tip about the Z axis parallel to the laser beams 6 or 35.

Figure 7:
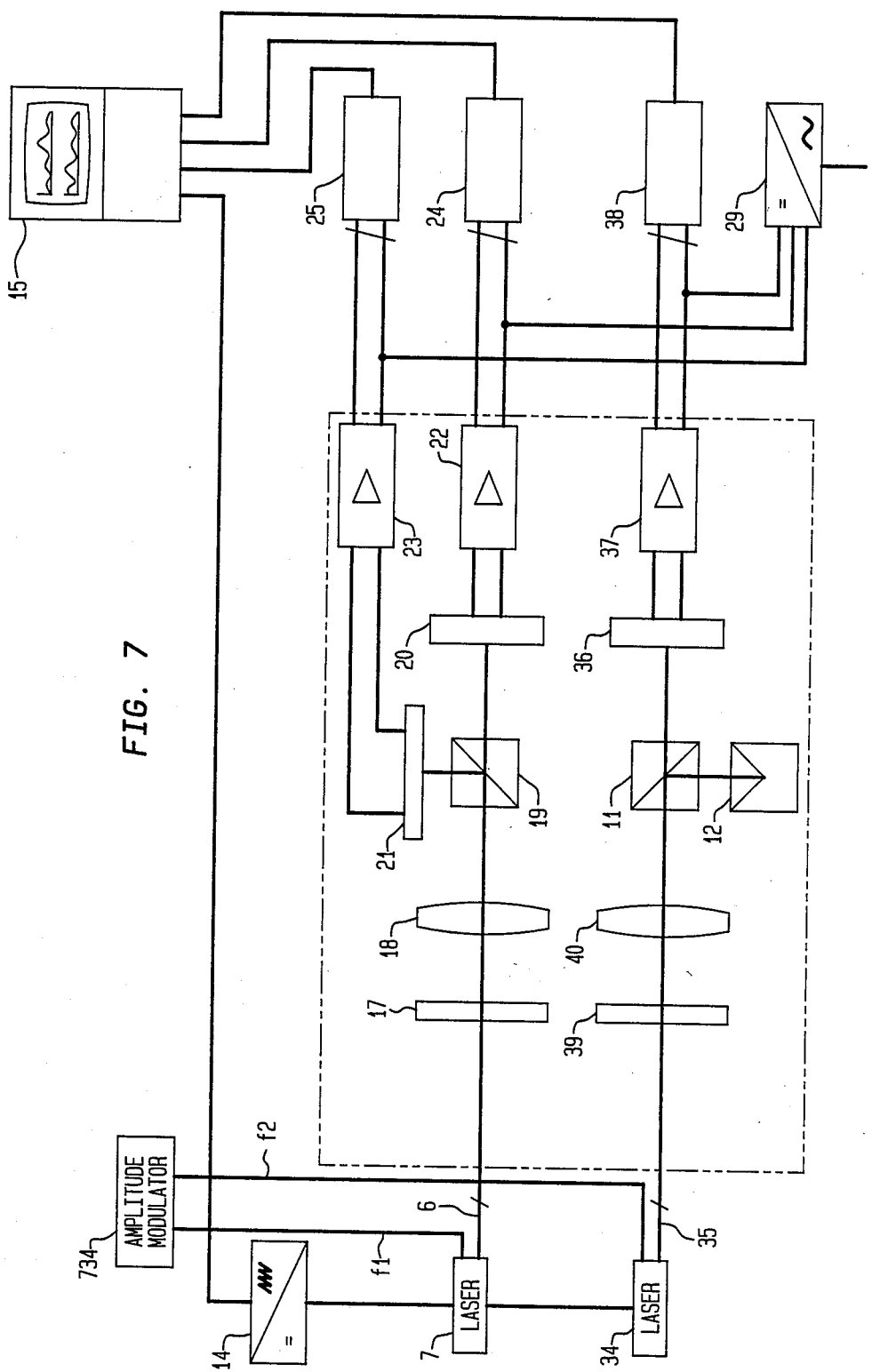
FIG. 7 is a further modified circuit diagram analogous to FIG. 4.

A variant of this is shown in FIG. 7, which is intended to show that a unit comprising an interference filter 39 and an optical system 40 can also be located in the laser beam 35. FIG. 7 is also intended to show that the beam splitter 11 and triple mirror 12 can equally well be located in the path of the laser beam 35, instead of in the path of the laser beam 6.

As shown in FIG. 4b, a further variant in terms of the rotation of the measuring head 4 about the Z axis can be provided by using two laser beams 6 and 6' emitted directly next to and parallel with one another, which are mutually amplitude modulated. In that case the signals of the spots of light generated on the position sensitive photodetector 20 (using FIG. 4 as an example) are switched in terms of modulation frequency to different inputs 24' and 38' of the computer, where they are brought into a suitable mutual relationship in terms of the aforementioned rotation about the Z axis. An amplitude modulator 734 (FIGS. 6, 7) provides different AM frequencies f1, f2 for the respective laser beams 6 or 6' and 35.

As shown, with the apparatus described above it is readily possible, in a fully automated manner, to detect and plot deviations in the movement of the tool tip 3 of the arm 2 of an industrial robot 1 from a predetermined path when subjected to a variably large load in a manner not shown in detail. The values obtained are of high accuracy, and depending on conditions in an individual case the required measuring range can be adapted by simply interchanging the optical system 18.

Various changes and modifications may be made, and features described in connection with any one of the embodiments may be used with any of the other, within the scope of the inventive concept.

Figure 4A:
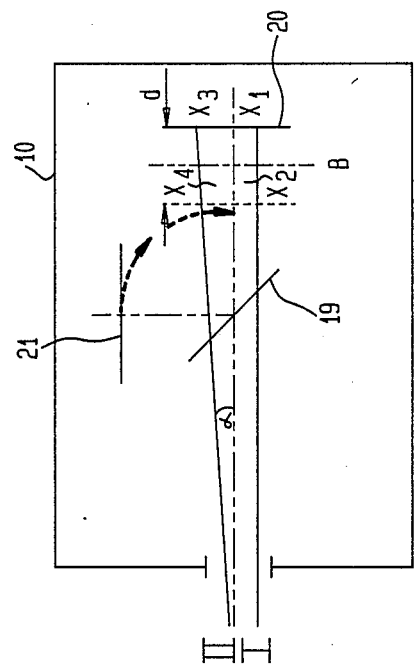
FIG. 4a is a diagram used in connection with explanation of the computation used in the apparatus.

The computations to be carried out by the computer 15 are known and can be based on algorithms which are known and standard in the industry. For example, FIG. 4a illustrates how to find the different values in the X plane, whereby the beam impingment position responsive photo detector 21 is swiveled over 90° about the beam splitter 19 into parallel position with beam impingment position responsive photo detector 20 for better clarification.

If a beam I is parallel to Z axis, the values in the X plane at the beam impingment position responsive photo detectors 20 and 21 are $X_1$ and $X_2$ which in this case are equal. With a reference plane B as free electable plane of reference parallel to beam impingment position responsive photo detector 20 the X deviation is $$\frac{X_1 + X_2}{2}$$

If a beam II is inclined with an angle $\alpha$ to Z axis indicating a rotation of measuring head 4 about the Y axis, this angle is determined by $$\alpha = \arctan \frac{X_3 - X_4}{d},$$

whereby d is the difference of the distances between beam splitter 19 and beam impingment position responsive photo detectors 20 and 21 respectively.

In this case on the other hand the X deviation is $$\frac{X_3 + X_4}{2}.$$

There are corresponding conditions concerning the Y plane with an angle $\beta$ not shown. Normally both X an Y deviations as well as angles $\alpha$ and $\beta$ appear.

If as shown in the accompanying drawings an optical system 18 is in use, it is only necessary to additionally bear in mind the characteristics of this system.

We claim:

1. A measuring system, to determine the accuracy of movement or position of a machine element, having
    a laser beam generator (7) projecting a laser beam along a predetermined axis;
    a measuring head (4) located on the machine element and including a first beam-impingement-position-responsive photo-detector (20) located in the path of the laser beam and providing first output signals representative of the location of beam impingement on the first photo-detector; and a computer apparatus (15) receiving said first output signals and processing the signals, said system comprising, in accordance with the invention, a beam splitter (19) located in the measuring head and positioned in the path of the laser beam, and in advance of said first photo-detector (20) at a first distance, the beam splitter splitting the beam into two beam portions and deflecting one of said beam portions out of said axis and in a direction at an angle with respect to said axis;

a second beam-impingement-position-responsive photo-detector (21) located in the path of said one deflected beam portion at a second distance relative to the beam splitter, said second distance being different from said first distance, said second beam-impingement-responsive photo-detector providing second output signals, said second output signals being received by the computer apparatus, and means for detecting rotation of said measuring head (4) about said predetermined axis;

said computer apparatus computing the deviation of the measuring head with respect to said beam, based on deviation, from a reference position, of said two beam portions on the first and second photo-detectors.

2. The system of claim 1, further including an optical system (18) located in the measuring head and in advance of said beam splitter (19) for changing the measuring range response of the first and second photo detectors (20, 21).

3. The system of claim 2, further including an interference filter (17) forming part of said optical system and located in the path of the laser beam (6) in advance of optical elements changing the measuring range of the photo detectors.

4. The system of claim 2, wherein the optical system (18) has a first characteristic;

and said optical system is interchangeable with respect to another optical system having a characteristic different from said first characteristic.

5. The system of claim 1, further including a second beam splitter (11) located in the measuring head (4) and positioned in advance of said beam splitter (19) positioned in advance of said first photo detector, said second beam splitter splitting the laser beam (6) into a split portion and a continuing portion, the split portion being deflected in a direction at an angle with respect to said beam axis;

an optical reflector element (12) positioned to receive said split beam portion and parallel reflecting the split beam portion back to the second beam splitter for return to said laser beam generator (7);

beam reception means (74) associated with said laser beam generator to receive the parallel reflected split portion;

and interferometric means (75) responsive to the beam of the laser beam generator and the parallel reflected split portion, coupled to said computer (15) to determine the spacing or distance between the laser beam generator (7) and the measuring (4) and hence said machine element (3).

6. The system of claim 5, wherein the second beam splitter (11) deflects more than 50% of the laser beam to the optical reflector element (12).

7. The system of claim 6, wherein about 95% of the laser beam (6) is reflected by the second beam splitter (11) to the optical reflector element (12).

8. The system of claim 5, wherein the angle with respect to the axis of the laser beam (6) with which the second beam splitter (11) deflects the split portion of the beam is 90°.

9. The system of claim 1, wherein the angle with respect to the axis of the laser beam (6) with which the beam splitter (19) deflects the split portion of the beam is 90°.

10. The system of claim 1, further comprising a second laser beam generator (34) projecting a second laser beam (35) parallel to said predetermined axis of the first laser beam;

and a further beam impingement position responsive photo detector (36) located adjacent at least one of said first and second photo detectors (20, 21) and located in the path of said further laser beam and providing further output signals, said further output signals being applied to said computer apparatus (15).

11. The system of claim 1, wherein said rotation detecting means comprises a further laser beam (6') projected from the laser beam generator (7), parallel to said predetermined axis of the first laser beam (6), toward said measuring head (4);

said further laser beam (6') impinging upon a selected one (20) of said photo-detectors, located in the path of said further laser beam (6');

means (734) for mutually amplitude-modulating the first and the further laser beams (6, 6' with different modulation frequencies (f1, f2), said selected photo-detector (20) having separate outputs associated respectively with one of said different modulation frequencies and connected to individual separate inputs of said computer apparatus (15), and said computer apparatus analyzing the signals associated with said respective modulation frequencies to determine the rotational position of said measuring head about said predetermined axis.

12. The system of claim 1, wherein the photo detectors are located at right angles with respect to the associated laser beam.

13. A measuring system, to determine the accuracy of movement or position of a machine element, having a first laser beam generator (7) projecting a first laser beam along a predetermined axis;

a measuring head (4) located on the machine element and including a first beam-impingement-position-responsive photo-detector (20) located in the path of said first laser beam and providing first output signals representative of the location of beam impingement on the first photo-detector; and a beam splitter (19) located in the measuring head and positioned in the path of said first laser beam, and in advance of said first photo-detector (20) at a first distance, said beam splitter splitting the beam into two beam portions and deflecting one of said beam portions out of said axis and in a direction at an angle with respect to said axis;

a second beam-impingement-position-responsive photo-detector (21) located in the path of said one deflected beam portion at a second distance relative to the beam splitter, said second distance being different from said first distance,
said second beam-impingement-responsive photo-detector providing second output signals;
a further laser beam generator (34) projecting a further laser beam (35), in parallel to said predetermined axis, toward said measuring head;
a further beam-impingement-responsive photo-detector (36) located in the path of the further laser beam (35) and providing further output signals; and
a computer apparatus (15) receiving said first output signals, said second output signals, and said further output signals, and processing said first, second, and further output signals, and computing deviation of the measuring head with respect to at least one of said beams, including rotation of said measuring head about one of said axes, from a reference position based on said first and second beam portions and the two parallel laser beams (6, 35) and impingement of the first and second beam portions on the first and second photo-detectors and of the further beam (35) on the further photo-detector (36).

14. The system of claim 13, wherein said angle with respect to said axis is a right angle.

15. The system of claim 13, further including
a second beam splitter (11) located in the measuring head (4) and positioned in advance of said beam splitter (19) positioned in advance of said first photo detector, said second beam splitter splitting the laser beam (6) into a split and continuing portion, the split portion being deflected in a direction at an angle with respect to said beam axis;
an optical reflector element (12) positioned to receive said split beam portion and parallel reflecting the split beam portion back to the second beam splitter for return to said laser beam generator (7);
beam reception means associated with said laser beam generator to receive the parallel reflected split portion;
and interferometric means responsive to the beam of the laser beam generator and the parallel reflected split portion, coupled to said computer (15) to determine the spacing or distance between the laser beam generator (7) and the measuring head (4) and hence said machine element (3).

16. The system of claim 15, wherein the second beam splitter (11) deflects more than 50% of the laser beam to the optical reflector element (12).

17. The system of claim 15, wherein about 95% of the laser beam (6) is reflected by the second beam splitter (11) to the optical reflector element (12).

18. The system of claim 13, further including means for amplitude-modulating said first and further laser beams (6, 35) with different modulation frequencies,
and wherein said computer apparatus receives the output signals from said photo detectors separately, for processing the amplitude-modulated signals in accordance with the respective frequencies and computing, in accordance with the relationship of said frequencies, the relative position and rotation, in space, of said measuring head, with respect to said coordinate system.

19. A method of determining the accuracy of movement or position of a machine element, in space, with respect to a coordinate axial system (X, Y, Z) comprising
providing a first laser beam generator and a further laser beam generator (34);
locating on the machine element a first, a second, and a further beam impingement position responsive photo detector (20) positioned to receive laser radiation, further comprising the steps of
generating a first laser beam (6);
projecting said first laser beam towards the first photo detector to generate position responsive output signals;
splitting said first laser beam and deflecting a beam portion in a direction at an angle with respect to said beam axis on the second photo detector, and deriving second output signals from the second photo detector;
projecting a laser beam parallel to said beam axis on the further photo detector and providing further position dependent output signals;
and computing, based on the respectively generated first, second and further output signals the position of said measuring head in space with respect to said axes of the coordinate system, as well as the rotational position with respect to at least one of said axes.

20. The method of claim 19, including the step of frequency modulating said beams with different frequencies (f1, f2);
and wherein the step of computing the position of said measuring head includes analyzing the first, second and further output signals with respect to the modulating frequencies.

21. A measuring system, to determine the accuracy of movement or position of a machine element, having
a first laser beam generator (7) projecting a first laser beam along a predetermined axis;
a second laser beam generator (34) projecting a second laser beam (35) along a predetermined axis;
a measuring head (4) located on the machine element and including a first beam-impingement-position-responsive photo-detector (20) located in the path of the first laser beam and providing first output signals representative of the location of beam impingement on the first photo-detector; and
a computer apparatus (15) receiving said first output signals and processing the signals,
said system comprising, in accordance with the invention,
a beam splitter (19) located in the measuring head and positioned in the path of the first laser beam, and in advance of said first photo-detector (20) at a first distance,
the beam splitter splitting the beam into two beam portions and deflecting one of said beam portions out of said axis and in a direction at an angle with respect to said axis;
a second beam-impingement-position-responsive photo-detector (21) located in the path of said one deflected beam portion at a second distance relative to the beam splitter, said second distance being different from said first distance, said second beam-impingement-responsive photo-detector providing second output signals, said second output signals being received by the computer apparatus,
said computer apparatus computing the deviation of the measuring head with respect to said beam, based on deviation, from a reference position, of said two beam portions on the first and second photo-detectors; and a further beam-impingement-position-responsive photo-detector (36) located adjacent at least one of said first and second photo-detectors (20, 21) and located in the path of said second laser beam and providing further output signals, said further output signals being applied to said computer apparatus.

22. A measuring system, to determine the accuracy of movement or position of a machine element, having a first laser beam generator (7) projecting a first laser beam (6) along a predetermined axis;

a measuring head (4) located on the machine element and including a first beam-impingement-position-responsive photo-detector (20) located in the path of the first laser beam and providing first output signals representative of the location of beam impingement on the first photo-detector;

a further laser beam generator (34) projecting a further laser beam (35) towards said measuring head (4); and a computer apparatus (15) receiving said first output signals and processing the signals, said system comprising, in accordance with the invention, a beam splitter (19) located in the measuring head and positioned in the path of the first laser beam, and in advance of said first photo-detector (20) at a first distance, the beam splitter splitting the beam into two beam portions and deflecting one of said beam portions out of said axis and in a direction at an angle with respect to said axis;

a second beam-impingement-position-responsive photo-detector (21) located in the path of said one deflected beam portion at a second distance relative to the beam splitter, said second distance being different from said first distance, said second beam-impingement-responsive photo-detector providing second output signals, said second output signals being received by the computer apparatus, said computer apparatus computing the deviation of the measuring head with respect to said beam, based on deviation, from a reference position, of said two beam portions on the first and second photo-detectors; and a further beam-impingement-position-responsive photo-detector (36) located in the path of said further laser beam (35);

means (734) for modulating the first and the further laser beams (6, 35) with different modulation frequencies (f1, f2), the output signals from said first and second photo-detectors (20, 21) and the further photo-detector (36) being connected to individual separate inputs of said computer apparatus (15), said computer apparatus analyzing the respective differently modulated beams to determine rotational position of said measuring head about said predetermined axis.

* * * * *